(12) United States Patent
Diez-Martinez Cervantes

(10) Patent No.: US 7,311,190 B2
(45) Date of Patent: Dec. 25, 2007

(54) MOTOR CLUTCH FOR WINDOW REGULATOR MOTOR

(75) Inventor: Gerardo Diez-Martinez Cervantes, Columbia, TN (US)

(73) Assignee: Dura Global Technologies, Inc., Rochester Hills, MI (US)

(*) Notice: Subject to any disclaimer, the term of this patent is extended or adjusted under 35 U.S.C. 154(b) by 256 days.

(21) Appl. No.: 11/115,834

(22) Filed: Apr. 27, 2005

(65) Prior Publication Data

US 2006/0243557 A1 Nov. 2, 2006

(51) Int. Cl.
*F16H 57/10* (2006.01)

(52) U.S. Cl. .......................................... 192/223; 192/15

(58) Field of Classification Search ................ 192/215, 192/223, 223.1, 15, 16, 43.1, 45.1; 188/134
See application file for complete search history.

(56) References Cited

U.S. PATENT DOCUMENTS 2,573,939 A * 11/1951 Verville et al. .......... 192/223.2
4,899,608 A * 2/1990 Knappe et al. ................ 74/411
5,404,975 A * 4/1995 Michel ...................... 192/223.1

* cited by examiner

*Primary Examiner*—Richard M Lorence
(74) *Attorney, Agent, or Firm*—Kevin S. MacKenzie; Gifford, Krass, Groh, Sprinkle; Dean B. Watson

(57) ABSTRACT

A clutch assembly for a window regulator motor includes a gear housing with a helical gear disposed in the gear housing. The helical gear includes first and second circumferential surfaces. An opposing pair of slots is formed through the first circumferential surface of the helical gear. A cushion is coupled to the helical gear. A cushion plate is in turn connected to the cushion. A pair of spaced locking pawls is pivotally attached to the helical gear and extends through the pair of slots formed through the first circumferential surface. The cushion plate includes a cam section formed thereon. The cam section contacts one of the pair of locking pawls in response to rotation between the helical gear and cushion plate wherein the locking pawl engages a gear housing preventing movement of the helical gear.

18 Claims, 5 Drawing Sheets

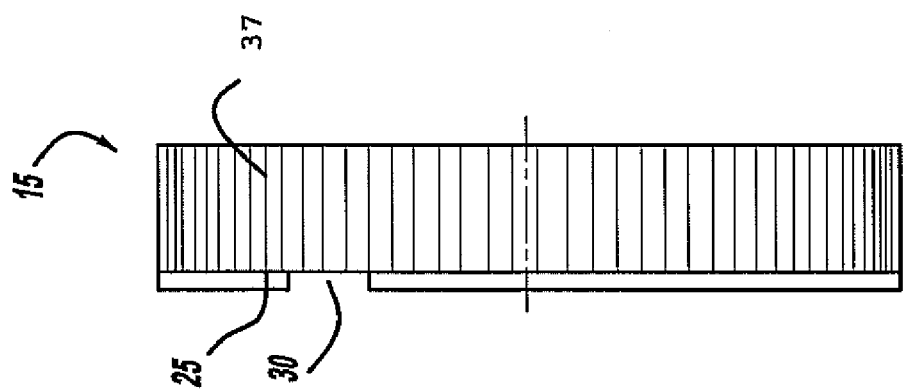
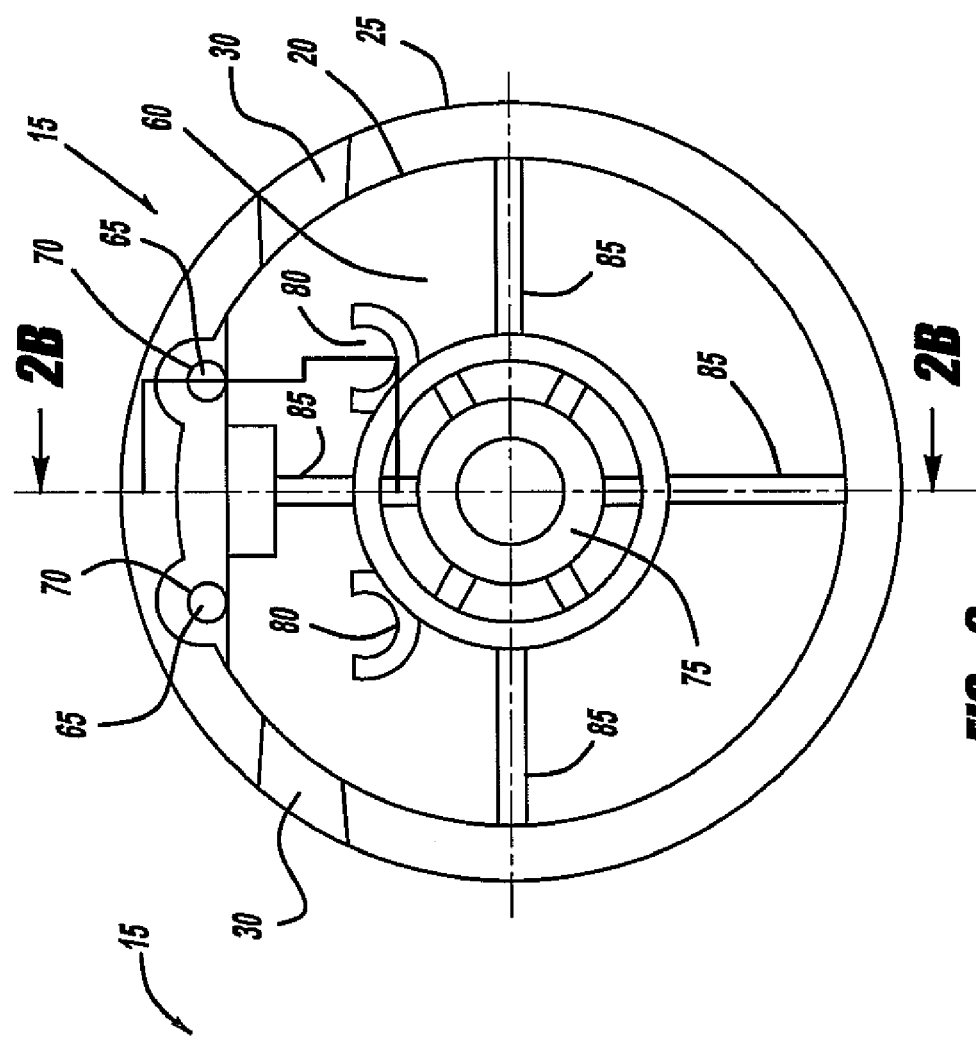
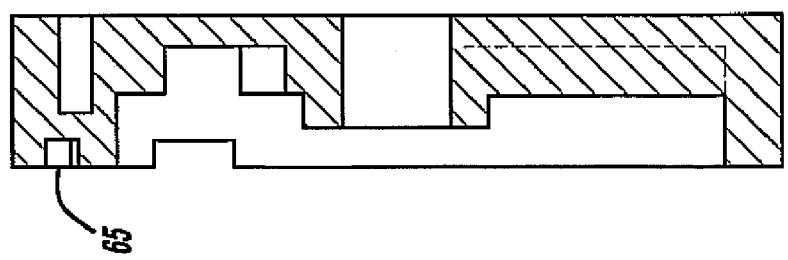

MOTOR CLUTCH FOR WINDOW REGULATOR MOTOR

FIELD OF THE INVENTION

The present invention relates to motor clutches, and more preferably to motor clutches for use in a window regulator motor.

BACKGROUND OF THE INVENTION

Powered window mechanisms include an electric motor coupled with the window regulator to move the window in an up and down motion. Generally, the electric motor includes a worm reduction mechanism having a worm shaft that is linked to an armature shaft of the electric motor. As the motor is actuated the armature shaft rotates transmitting torque to the worm shaft and reduced by a worm mechanism including a helical gear or drive gear. The drive gear is coupled to a window regulator to move the window up and down.

If a force is applied to the window, the force can be transferred through the regulator and to the worm drive and motor back driving the motor, leading to the possibility of damage to the mechanism. Additionally, if the motor is allowed to be back driven, the window can be opened from the outside of a vehicle by unauthorized persons. There is therefore a need in the art for a clutch mechanism preventing the transfer of force from a window to back drive an electric motor. Additionally, there is a need for a clutch mechanism that utilizes minimal packaging space and has a low cost and reduced number of parts.

SUMMARY OF THE INVENTION

A clutch assembly for a window regulator motor includes a gear housing with a helical gear disposed in the gear housing. The helical gear includes first and second circumferential surfaces. An opposing pair of slots is formed through the first circumferential surface of the helical gear. A cushion is coupled to the helical gear. A cushion plate is in turn connected to the cushion. A pair of spaced locking pawls is pivotally attached to the helical gear and extends through the pair of slots formed through the first circumferential surface. The cushion plate includes a cam section formed thereon. The cam section contacts one of the pair of locking pawls in response to rotation between the helical gear and cushion plate wherein the locking pawl engages a gear housing preventing movement of the helical gear.

BRIEF DESCRIPTION OF THE DRAWINGS

FIG. 2 is a top view of the helical gear of the clutch assembly of the present invention;

FIG. 2A is a side view of the helical gear of the clutch assembly of the present invention;

FIG. 2B is a sectional view of the helical gear cut along the line A-A of FIG. 2;

DETAILED DESCRIPTION OF THE PREFERRED EMBODIMENTS

Figure 1:
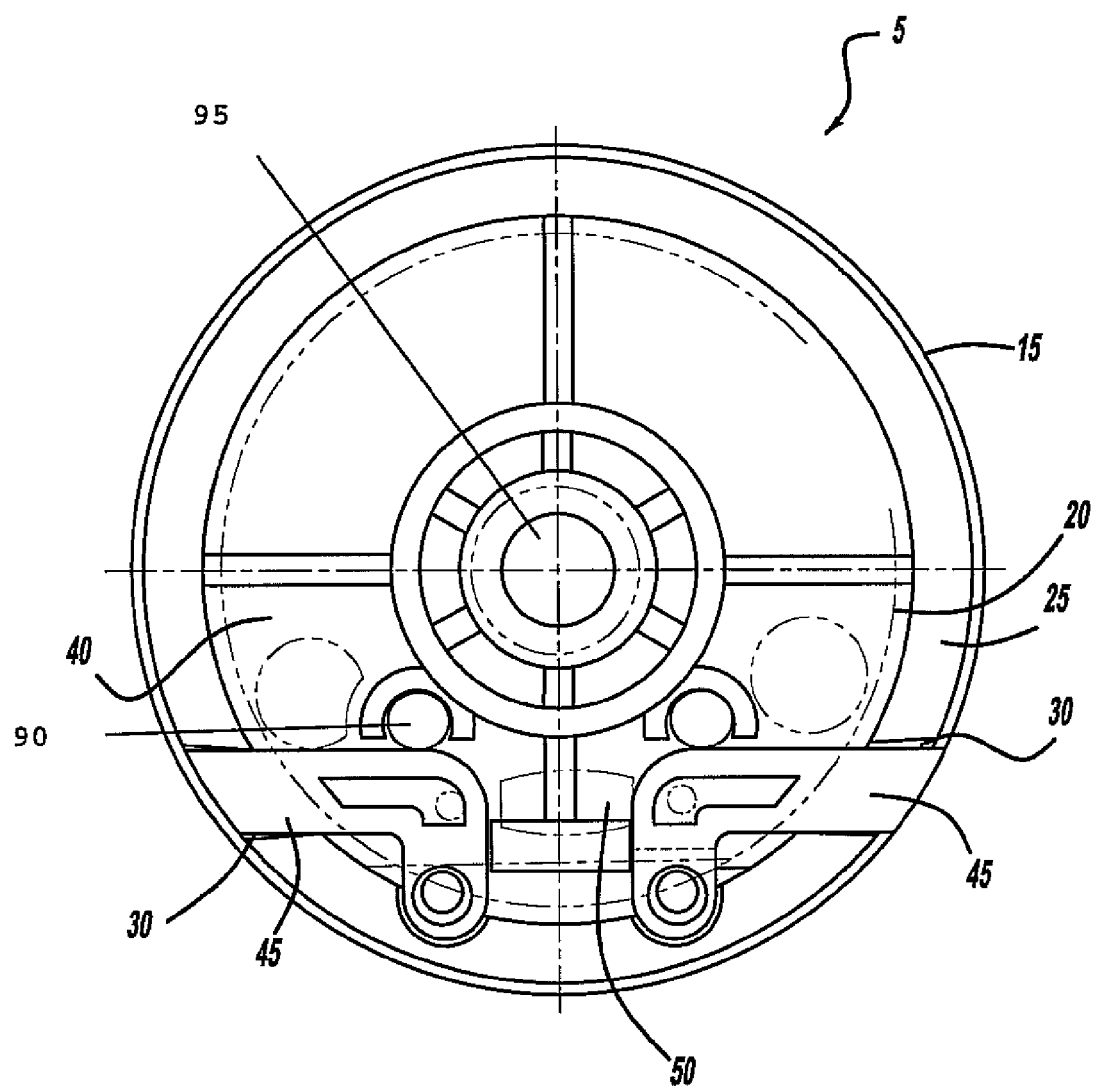
FIG. 1 is a top view of the clutch assembly of the present invention.

Referring to FIG. 1, there is shown the clutch assembly 5 of the present invention. The clutch assembly 5 includes a gear housing 10 and a helical gear 15 disposed within the gear housing 10. The helical gear 15 includes first and second circumferential surfaces 20, 25. A pair of opposing slots 30 is formed through the first circumferential surface 20 of the helical gear 15. A cushion 35 is coupled to the helical gear 15 and to a cushion plate 40. A pair of spaced locking pawls 45 is pivotally attached to the helical gear 15 and extends through the pair of slots 30 formed through the first circumferential surface 20 of the helical gear 15. The cushion plate 40 includes a cam section 50 formed thereon. The cam section 50 contacts one of the pair of locking pawls 45 in response to rotation between the helical gear 15 and the cushion plate 40, causing the locking pawl to engage the gear housing 10 preventing movement of the helical gear 15.

Referring to FIGS. 2, 2A and 2B, there is shown the helical gear 15 of the present invention. The helical gear 15 includes first and second circumferential surfaces 20, 25. The first circumferential surface 20 is disposed above the second circumferential surface 25 when viewed from the side. In a preferred aspect, the second circumferential surface 25 includes gear teeth 37 formed thereon for mating with a worm gear (not shown). The helical gear 15 also includes an interior portion 60 bounded by the first circumferential surface 20 and positioned inboard extending longitudinally relative to the second circumferential surface 25. The interior portion 60 preferably includes pivot slots 65 formed therein for receiving mounting pins 70 That pivotally attach the locking pawls 45 to the helical gear 15. In a preferred aspect, the slots 170 formed in the locking pawls 45 are oversized relative to the mounting pins 70 for allowing limited radial movement of the locking pawls 45.

The helical gear 15 also includes a hub 75 formed in a center of the interior portion 60. The hub 75 includes a pair of pockets 80 formed thereon. The pockets 80 are preferably positioned proximal to the pair of locking pawls 45 that are pivotally attached to the helical gear 15. Additionally, the helical gear includes a plurality of ribs 85 that extend radially from the hub of the helical gear 15. The ribs 85 are adapted to mate with the cushion 35, as will be described in more detail below. Elastomeric bumpers 90 are received in the pair of pockets 80 formed on the hub 75 to contact the locking pawls 45 for dampening rattle and vibrations of the locking pawls 45.

The helical gear 15 is preferably disposed in the gear housing 10 for rotational movement within the gear housing 10. As is commonly known in the art, the gear housing 10 may include a central pivot extension 95 about which the helical gear 15 is disposed for rotation within the gear housing 10.

Figure 3:
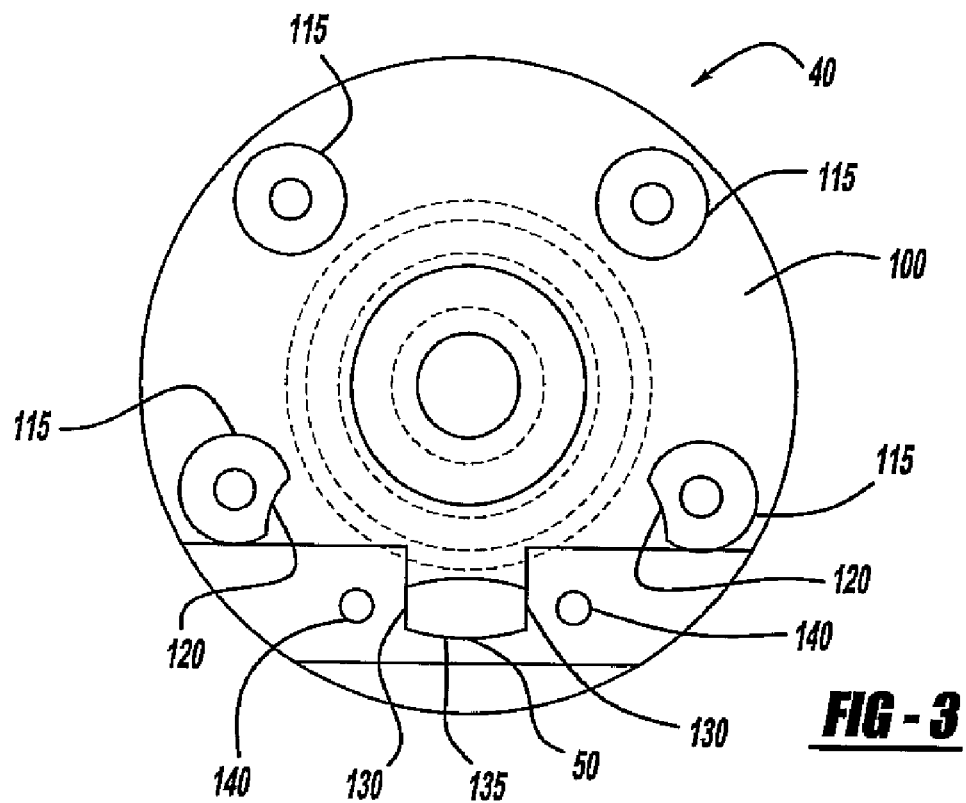
FIG. 3 is a top view of the cushion plate of the clutch assembly of the present invention.
Figure 3A:
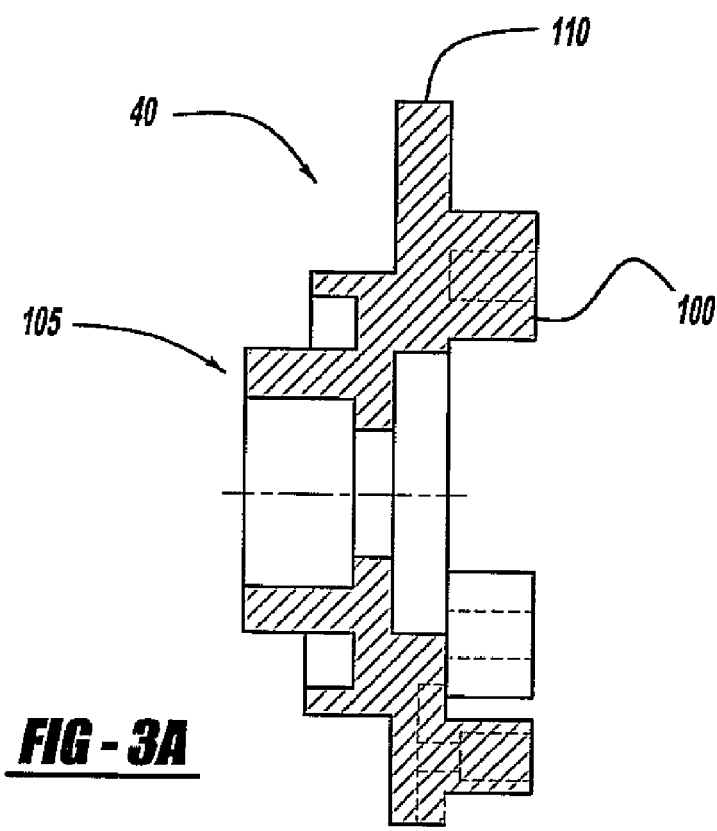
FIG. 3A is a sectional view of the cushion plate of FIG. 3.

Referring to FIGS. 3 and 3A, there is shown the cushion plate 40 of the present invention. The cushion plate 40 includes opposite first and second surfaces 100, 105 bounded by a circumferential surface 110. The first surface 100 preferably includes a plurality of longitudinally extending cylindrical extensions 115. Two of the plurality of cylindrical extensions 115 formed on the lower portion of the cushion plate 40 contact the locking pawls 45 for releasing the locking pawls 45 from engagement with the gear housing 10. In a preferred aspect, the cylindrical extensions 115 contacting the locking pawls 45 include arcuate cutout sections 120 that accommodate the pockets 80 formed on the helical gear 15. The upper two of the plurality of cylindrical extensions 115 are received in holes 125 formed in the cushion 35 for coupling the cushion 35 and cushion plate 40, as will be described in more detail below.

As stated above, the cushion plate 40 includes a cam section 50 formed thereon. The cam section 50 is preferably formed on an upper middle portion of the cushion plate 40. The cam section 50 includes opposing side surfaces 130 joined by an upper end surface 135. The opposing side surfaces 130 contact the locking pawls 45 to engage the locking pawls 45 with the gear housing 10. The cushion plate 40 additionally includes pins 140 that extend from the first surface 100 and are received in location slots 145 formed in the locking pawls 45, as will be discussed in more detail below. The cushion plate 40 is positioned above the helical gear 15 when the components are assembled to form the clutch assembly 5 with the cushion 35 linking the helical gear 15 and the cushion plate 40.

Figure 4:
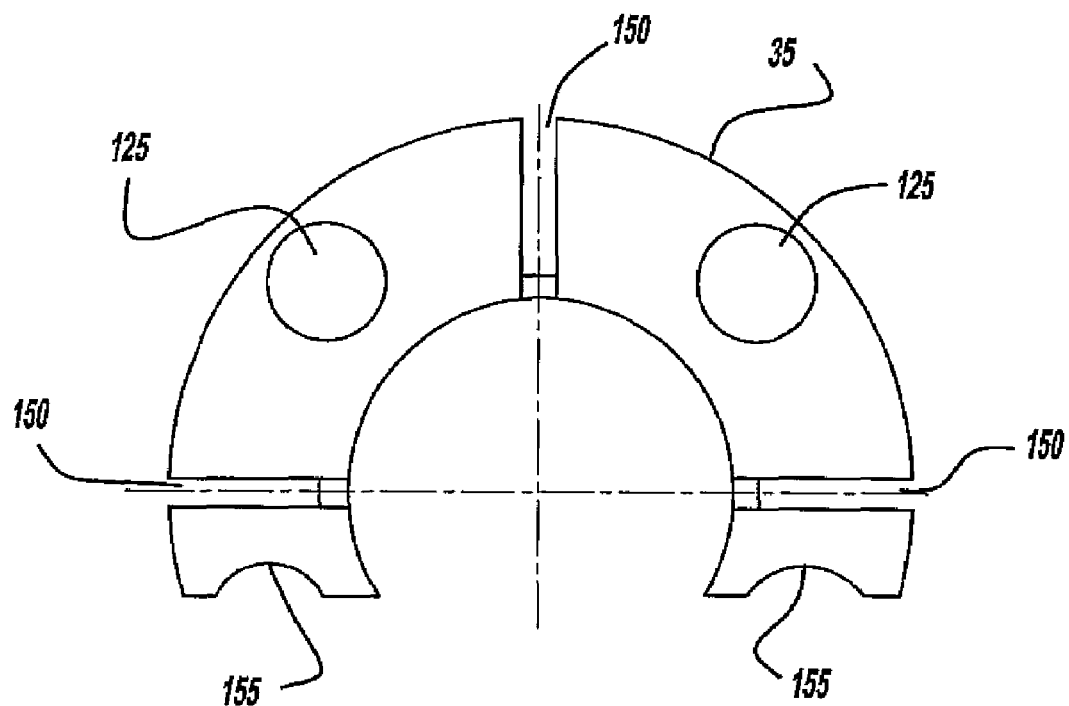
FIG. 4 is a top view of the cushion of the clutch assembly of the present invention.
Figure 4A:
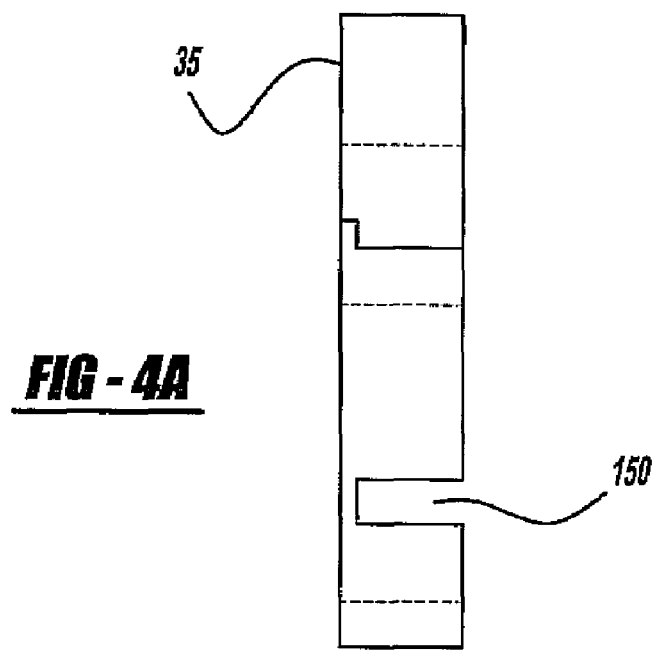
FIG. 4A is a front view of the cushion of the clutch assembly of the present invention.

Referring to FIGS. 4 and 4A, there is shown the cushion 35 of the clutch assembly 5. The cushion 35 preferably has a semicircular shape with holes 125 formed therein for mating with the cushion plate 40, as described above. Additionally, the cushion 35 preferably includes a plurality of radially spaced slots 150 formed therein for receiving The plurality of ribs 85 of the helical gear 15. The plurality of spaced radial slots 150 define a plurality of zones within the cushion plate 35. Each zone is capable of movement and transfer of force independent of the other zones. In a preferred aspect, The cushion is made of an elastomer material allowing for flexible transfer of force between the helical gear 15 and cushion plate 40. Additionally, the cushion 35 preferably includes arcuate notches 155 formed on the lower end surfaces for accommodating the cylindrical extensions 115 formed on the cushion plate 40.

Figure 5:
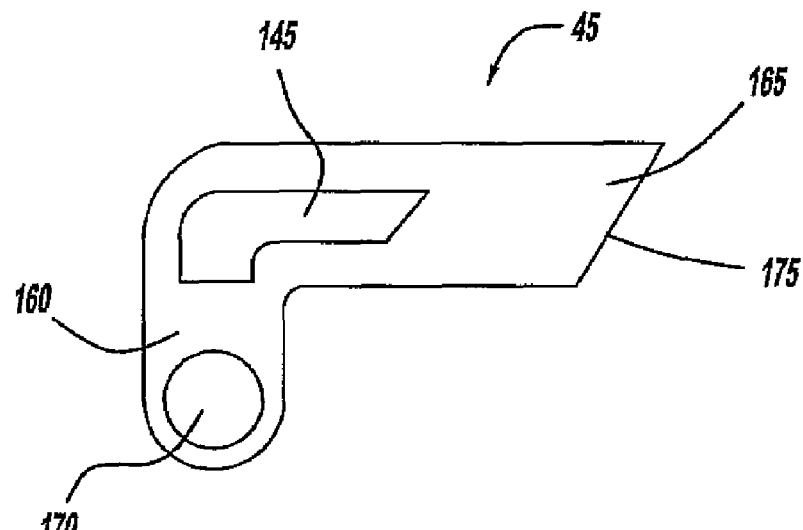
FIG. 5 is a top view of the locking pawl of the clutch assembly of the present invention.
Figure 5A:
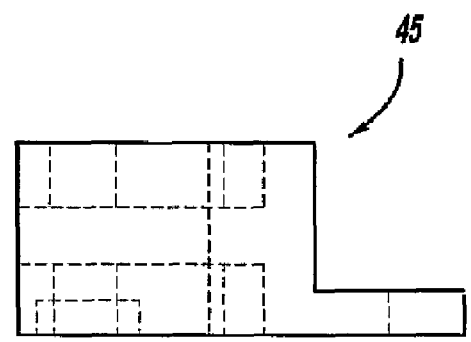
FIG. 5A is a front view of the locking pawl of FIG. 5.
Figure 5B:
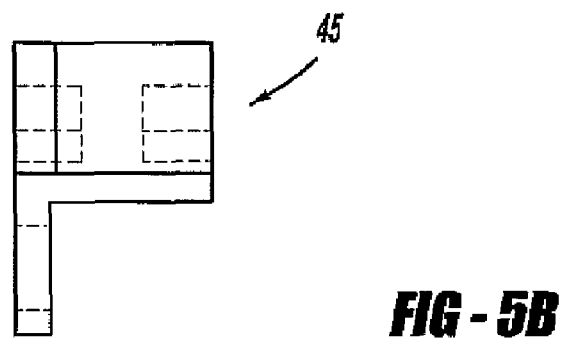
FIG. 5B is a side view of the locking pawl of FIG. 5.

Referring to FIGS. 5, 5A and 5B, there is shown the locking pawls 45 of the clutch assembly 5 of the present invention. The locking pawls 45 include first and second legs 160, 165 joined at an angle. The first leg 160 preferably includes a slot 170 formed therein for receiving the mounting pin 70 for pivotally attaching the locking pawl 45 to the helical gear 15. The second leg 165 includes a location slot 145 formed therein, with the second leg 165 terminating at an engagement surface 175 for contacting the gear housing 10. The engagement surface 175 preferably includes an arcuate shape such that as the locking pawl 45 pivots about the pin attached to the helical gear, the engagement surface 175 is partially engaged before becoming fully engaged with the gear housing 10. The engagement surface 175 may alternatively include locking teeth formed thereon for contacting and engaging corresponding locking teeth formed on the gear housing 10. As stated above, the cushion plate 40 includes pins 140 that are received within the location slot 145 formed through the second leg 165 of the locking pawls 45. The pins 140 maintain the locking pawls 45 in a disengaged position relative to the gear housing 10 unless a back driving force is applied to the clutch assembly 5 causing the cam section 50 to pivot the locking pawl 45.

In use, the helical gear 15 is disposed within the gear housing 10 for rotational movement within the gear housing 10. A pair of spaced locking pawls 45 are pivotally attached to the helical gear 15 and extend through the pair of slots 30 formed through the first circumferential surface 20 of the helical gear 15. A cushion 35 is coupled to the helical gear 15 by positioning the cushion 35 such that the radial slots 150 receive the ribs 85 formed on the helical gear 15. The cushion plate 40 is positioned above the helical gear 15 and cushion 35 such that the cylindrical extensions 115 of the cushion plate 40 are received in the holes 125 formed in the cushion 35. The cam section 50 of the cushion plate 40 is positioned between the pair of locking pawls 45 to move the locking pawls 45 radially outward in response to rotation between the helical gear 15 and cushion plate 40, such that the locking pawl 45 engages the gear housing 10 preventing movement of the helical gear 15.

If a back driving force is applied to the clutch assembly 5, the helical gear 15 rotates relative to the cushion plate 40, causing the cam section 50 to engage one of the pair of locking pawls 45 depending on the direction of rotation. The cam section 50 causes the locking pawl 45 to pivot about the mounting pin 70 attached to the helical gear 15 such that the locking pawl 45 engages the gear housing 10 preventing movement of the helical gear 15, thereby preventing transfer of the back driving force to a worm or motor of a window regulator motor.

Once the back driving force is removed from the system, the helical gear 15 rotates in an opposite direction relative to the cushion plate 40 causing the cylindrical extensions 115 of the cushion plate 40 to contact the locking pawls 45 to move the locking pawls 45 radially inward, disengaging the locking pawls 45 from the gear housing 10. Additionally, the pins 140 formed on the cushion plate 40 are disposed in the location slot 145 formed on the locking pawls 45 to urge the locking pawls 45 radially inward and maintain the locking pawl 45 in a disengaged position relative to the gear housing 10, unless a back driving force is applied to the clutch assembly 5.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A clutch assembly for a window regulator motor comprising:
   a gear housing;
   a helical gear disposed in the gear housing, the helical gear including first and second circumferential surfaces, the helical gear including an opposing pair of slots formed though the first circumferential surface of the helical gear;
   a cushion coupled to the helical gear;
   a cushion plate connected to the cushion;
   a pair of spaced locking pawls pivotally attached to the helical gear and extending through the pair slots formed through the first circumferential surface of the helical gear;
   the cushion plate including a cam section formed thereon, the cam section contacting one of the pair of locking pawls in response to rotation between the helical gear and cushion plate wherein the locking pawl engages the gear housing preventing movement of the helical gear.

2. The clutch assembly of claim 1 wherein the helical gear includes an interior portion bounded by the first circumferential surface and positioned inboard and longitudinally spaced relative to the second circumferential surface.

3. The clutch assembly of claim 1 wherein the interior includes pivot slots formed therein for receiving mounting pins for pivotally attacking the locking pawls to the helical gear.

4. The clutch assembly of claim 1 wherein the helical gear includes a plurality of ribs extending radially from a center of the helical gear.

5. The clutch assembly of claim 4 wherein the cushion includes a plurality of slots formed therein for receiving the plurality of ribs of the helical gear.

6. The clutch assembly of claim 1 wherein the helical gear includes a hub formed in a center of the helical gear, the hub including a pair of pockets formed thereon, the pockets positioned proximal to the pair of locking pawls pivotally attached to the helical gear.

7. The clutch assembly of claim 1 including elastomeric bumpers received in the pair of pockets for dampening rattle and vibrations of the locking pawls.

8. The clutch assembly of claim 1 wherein the cushion plate includes opposite first and second surfaces bounded by a circumferential surface, the first surface including a plurality of longitudinally extending cylindrical extensions.

9. The clutch assembly of claim 8 wherein two of the plurality of cylindrical extensions contact the locking pawls for releasing the locking pawls from engagement with the gear housing.

10. The clutch assembly of claim 9 wherein the extensions contacting the locking pawls include arcuate cutout sections for accommodating pockets formed on a hub of the helical gear.

11. The clutch assembly of claim 9 wherein two of the plurality of cylindrical extensions are received in holes formed in the cushion for coupling the cushion and cushion plate.

12. The clutch assembly of claim 1 wherein the locking pawls include first and second legs joined at an angle.

13. The clutch assembly of claim 12 wherein the first leg includes a slot formed therein for receiving a mounting pin for pivotally attaching the locking pawl to the helical gear.

14. The clutch assembly of claim 13 wherein the slots formed in the first leg are oversized relative to the mounting pins for allowing limited radial movement of the locking pawls.

15. The clutch assembly of claim 12 wherein the second leg includes a location slot formed therein, the second leg terminating at an engagement surface for contacting the gear housing.

16. The clutch assembly of claim 15 wherein the cushion plate includes location pins formed thereon and received in the location slot of the locking pawls for maintaining the locking pawls in a disengaged position relative to the gear housing unless a back driving force is applied to the clutch assembly.

17. A clutch assembly for a window regulator motor comprising:
   a gear housing;
   a helical gear disposed in the gear housing, the helical gear including first and second circumferential surfaces, the helical gear including at least one slot formed through the first circumferential surface of the helical gear;
   a cushion coupled to the helical gear;
   a cushion plate connected to the cushion;
   at least one locking pawl pivotally attached to the helical gear and extending through the at least one slot formed through the first circumferential surface of the helical gear;
   the cushion plate including a cam section formed thereon, the cam section contacting the at least one locking pawl in response to rotation between the helical gear and cushion plate wherein the at least one locking pawl engages the gear housing preventing movement of the helical gear.

18. A clutch assembly for a window regulator motor comprising:
   a gear housing;
   a helical gear disposed in the gear housing, the helical gear including first and second circumferential surfaces, the helical gear including an opposing pair of slots formed through the first circumferential surface of the helical gear;
   a cushion coupled to the helical gear;
   a cushion plate connected to the cushion;
   a pair of spaced locking pawls including first and second legs joined at an angle, the first leg pivotally attached to the helical gear and the second leg extending through the pair of slots formed through the first circumferential surface of the helical gear;
   the cushion plate including a cam section formed thereon, the cam section contacting one of the pair of locking pawls in response to rotation between the helical gear and cushion plate wherein the locking pawl engages the gear housing preventing movement of the helical gear.

* * * * *